UNITED STATES PATENT OFFICE.

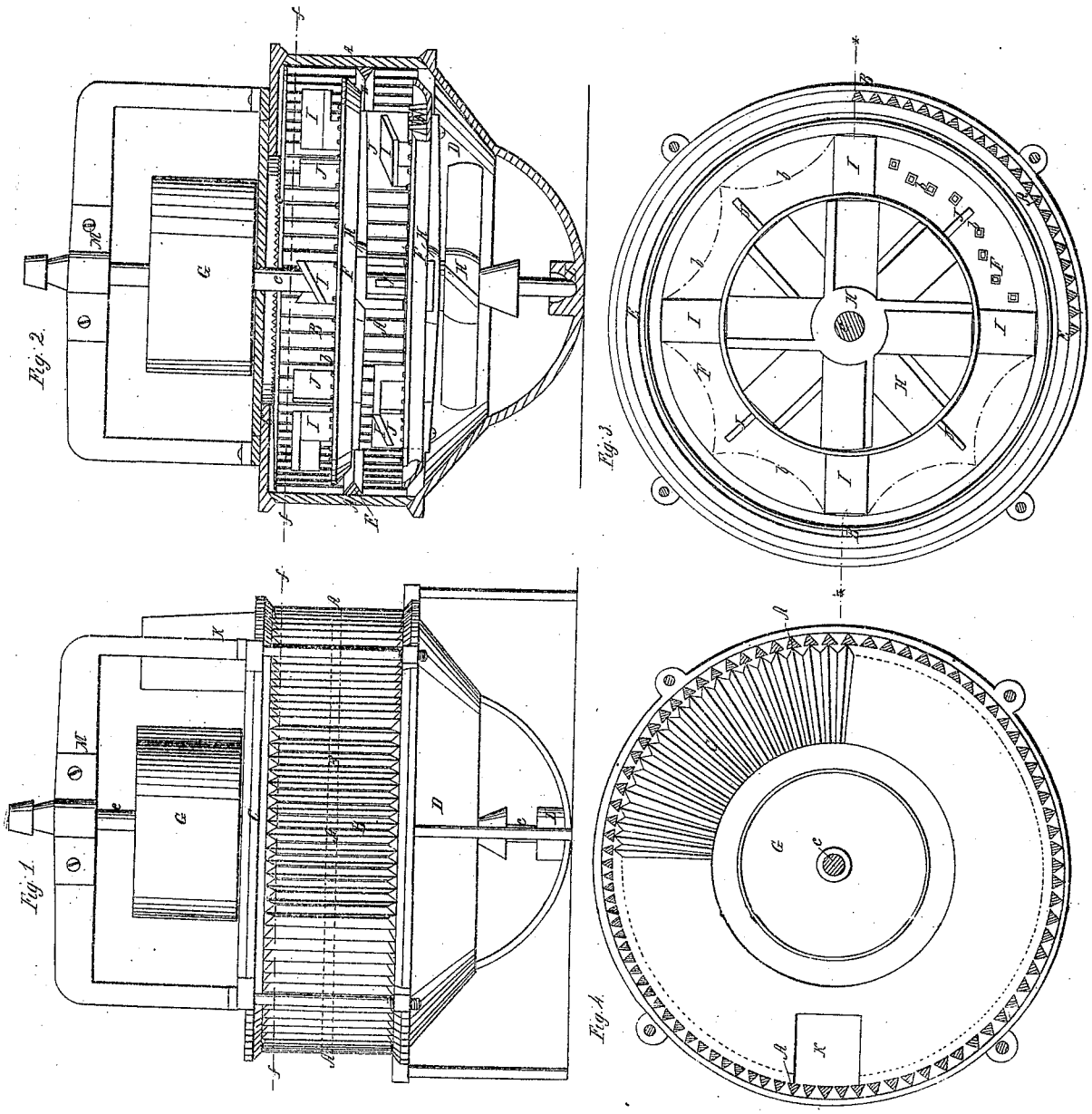

H. L. FULTON, OF CHICAGO, ILLINOIS.

SMUT-MACHINE.

Specification of Letters Patent No. 9,659, dated April 12, 1853.

*To all whom it may concern:*

Be it known that I, H. L. FULTON, of Chicago, in the county of Cook and State of Illinois, have invented certain new and useful Improvements in Smut-Machines for Cleaning Grain; and I do hereby declare that the following is a full, clear, and exact description of the same, reference being had to the accompanying drawings, forming part of this specification, in which—

Figure 1, is a side elevation of one of my improved machines. Fig. 2, is a vertical transverse section of the same, taken in the line *, *, in Fig. 3. Fig. 3, is a horizontal section, looking downward, through the red line *f*, *f*, in Figs. 1, and 2; this view shows a plan or birds eye view of the top dished shape scouring plate and the inclined and upright fans, &c. Fig. 4, is also a horizontal section through the line *f*, *f*, looking upward. This view shows an inverted plan of the top serrated plate of the machine.

The same letters of reference in each of the several figures indicate corresponding parts.

The nature of my invention consists first in the employment of a circular collar or prismatic shaped concentrator, secured to, and around the inner periphery of the concave or outer casing. The said concentrator being placed between each pair of revolving scouring plates, and inclining toward the center of the machine for the purpose of throwing the grain, as it is by centrifugal force and the fans &c. thrown against the inner periphery of the outer casing or concave; back toward the center of the machine upon the inclined fans and second scouring plate and thus the grain is prevented from passing down between the inner periphery of the case and the outer periphery of the revolving dished shaped plates before it is perfectly cleaned. 2d, the employment of the revolving dished shaped scouring plates in combination with the prismatic ring on the case, for the purpose of concentrating and directing the grain from one beater to the other.

A, A, represents the prismatic bars composing the concave B, these bars are so arranged that a small passage of precisely similar shape as the bars, are formed between each pair of bars for the escape of the dust. By constructing the case of prismatic bars, it may be made as strong as the case or concave composed of square flat bars, and at the same time admit of a more ready and free escape of the smut; this will be clearly seen by examining the drawings Figs. 3 and 4.

C, is the horizontal serrulated top, against which the grain is thrown by the inclined fans; and stripped of its smut and other impurities; this plate forms the top of the machine, the horizontal serrations cut in the same being of prismatic form.

D, is the funnel shaped bottom and discharge portion of the machine, this will be clearly seen in Fig. 2, of the drawing.

E, E, is the prismatic shaped concentrator, for causing the grain to be thrown toward the center of the machine, this circular brace and concentrator E, is secured to, and around the inner periphery of the case A B, between each pair of the revolving dished shaped scouring plates, and prevents the direct escape of the grain from the first scouring plate to the discharge passage, and throws it on to the second scouring plate from which it either passes out or on to a third plate.

F, F, represent, the revolving dished shaped scouring plates, one above the other, and secured fast on a vertical revolving shaft *c*, which has a pulley G, for driving it, secured on it, and also a number of spiral fans H, H, H, for creating a blast attached to it in the manner shown in Figs. 2 and 3. This shaft, plates and fans are all incased within the stationary concave B, in the manner shown in Fig. 2.

*b*, *b*, are small vertical teeth formed on the top surfaces of the plates for operating upon the grain when the machine is in motion.

By examining the drawing Fig. 2, the shape of the plates F, F, will be clearly seen; a portion of the lower one being broken away to show its concavity; these plates assist in scouring the grain and also serve to keep it longer in contact with the scouring surfaces of the machine.

I, I, I, I, represent the inclined fans, for throwing the grain toward the cerrulated top of the machine and also creating an upward and outward current. J, J, J, J, are the upright fans which operate in combination with the inclined fans and throw the grain on the scouring surfaces of the machine and also blow the dust and smut through the prismatic shaped openings between the bars composing the concave.

K, is the hopper, at which the grain is fed in.

L, is the step in which the lower end of the shaft C, rests and turns.

M, is the yoke in which the upper end of the shaft is secured and turns.

This machine may be bolted or screwed together in the manner shown in the drawing or in any other more suitable way.

Smut machines constructed and arranged after my improved plan will present more effectual scouring surface than any other machines in use, occupying the same space or even twice the same: this is an important feature in my invention and as it takes up so little perpendicular space, it combines all the advantages of the horizontal and perpendicular smut mills now in use, without embracing the disadvantages of either.

Having thus fully described the nature of my invention, I would state that I am aware that a flat plate on the inside of the concave has been used, this therefore I do not claim, but

What I do claim as my invention and desire to secure by Letters Patent is—

1. The circular prismatic shaped brace and concentrator E, arranged between each pair of revolving scouring plates, and secured fast to the inner periphery of the case B, for the purpose of concentrating the grain and throwing it upon the second scouring plate and thereby preventing its escape, before it is effectually cleaned, from the first scouring plate directly to the discharge passage substantially as described.

2. I also claim in combination with the revolving disk shaped plates or beaters F, substantially such as herein described, the prismatic ring E, for the purpose of concentrating and directing the grain from one beater to the other substantially as described.

H. L. FULTON.

Witnesses:
F. E. SICKELS,
A. B. STOUGHTON.